(12) United States Patent
Chung et al.

(10) Patent No.: US 6,761,636 B2
(45) Date of Patent: Jul. 13, 2004

(54) REAL TIME DATA EXCHANGE SYSTEM

(75) Inventors: Ho Ming Chung, Hong Kong (CN); Wing Kei Ip, Hong Kong (CN)

(73) Assignee: Fucom Company, Ltd., North Point (CN)

( * ) Notice: Subject to any disclaimer, the term of this patent is extended or adjusted under 35 U.S.C. 154(b) by 269 days.

(21) Appl. No.: 09/761,158

(22) Filed: Jan. 16, 2001

(65) Prior Publication Data

US 2002/0128065 A1 Sep. 12, 2002

(51) Int. Cl.[7] .................................................. A63F 9/24
(52) U.S. Cl. ........................................................ 463/42
(58) Field of Search ............................ 463/1–9, 29–30, 463/12–13, 36, 39, 25–26, 40–42, 43, 16–20, 47; 340/323 R; 345/156–157, 161, 169; 700/91–92; 348/552; 379/93.13; 709/200, 203; 725/105, 109–110, 114–116, 133, 141; 723/292–293, 143 R, 148 R

(56) References Cited

U.S. PATENT DOCUMENTS

| | | | | |
|---|---|---|---|---|
| 4,578,674 A | * | 3/1986 | Baker et al. |
| 4,924,216 A | * | 5/1990 | Leung |
| 5,259,626 A | * | 11/1993 | Ho |
| 5,421,590 A | * | 6/1995 | Robbins |
| 5,586,257 A | * | 12/1996 | Perlman |
| 5,605,505 A | * | 2/1997 | Han |
| 5,971,855 A | * | 10/1999 | Ng |

* cited by examiner

Primary Examiner—Mark Sager
(74) Attorney, Agent, or Firm—Alix, Yale & Ristas, LLP

(57) ABSTRACT

A system and method for real time data exchange which includes a game server having a multi-threaded, multi-processing operating system is and located at an ISP head end. The game server is equipped with a back end communication system for full duplex communications over the Internet. The system employs a plurality of personal computers each having means for connecting to the internet and logging onto the game server together with a plurality of handheld game playing devices each having a data communications link to one of the personal computers. Each of the personal computers has a first component of game software operating thereon. The game server has a second component of game software operating thereon and a game database operating thereon. The second component of game software includes first, second, third and fourth process threads, the first process thread is operable for receiving uplink communication packets to register and log in to the game database on the game server from each of the handheld game playing device through the data communications link and the Internet. The second process thread is operable for sending downlink communication packets to specific game software on any one of the personal computers. The third process thread is operable for receiving uplink communication packets from specific game software on each of the personal computers. A fourth process thread is operable for sending downlink communication packets to any one of the handheld game playing devices that include data from the game database.

24 Claims, 14 Drawing Sheets

User Name

User ID

Current IP Address

Figure 4

Login and Upload

| Hand Held Gaming Device | PC | Game Server |
|---|---|---|
| | | Process Login Request and Generate Session ID for User |
| | Activate PC-Link and Request for Serial No. | |
| Return Serial No. | | |
| | Request for Score and Status Data | |
| Return the Score and Status | | |
| | Update Server Score | |
| | | Process the Update Request |

Head to Head Game Play

| PC1 | PC2 | Game Server |
|---|---|---|
| Request Head to Head Game Play | | |
| | Process Request and Establish InputStream/OutputStream Communication Channel Pair | |
| Update Game Result | | |
| | | Process Update |
| | Update Game Result | Process Update |

PC-Link Download

| Hand Held Gaming Device | PC | Game Server |
|---|---|---|
| | Download Data Request | |
| Process Request, Return Status | | |

Figure 13

REAL TIME DATA EXCHANGE SYSTEM

BACKGROUND OF THE INVENTION

The present patent application relates to communication services delivered via a computer system ISP (Internet service provider) network infrastructure and, in particular, to multi-user game playing via an ISP network.

Video games, computer games and online games are well known in the art. Video games function with many hardware platforms and in many software varieties. Video arcade games may be special devices for playing only one application program or game program while home video game devices generally accept cartridges to allow the user to select from a library of cartridges containing game application software. Also, popular are computer games in which a personal computer is used as the hardware platform and application game software is loaded via floppy disk or CD-ROM. Online games are also structured for many Internet platforms and in many software varieties. Such online games may use a personal computer or Internet device as the hardware platform and application game software is loaded via an ISP network or CD-ROM.

There is a need in the art for the delivery of multiple player, multiple game playing services to Internet service subscribers with real time two-way communications in an uncertain communication medium. There is a further need in the art for the ability of multiple Internet service subscribers to play video games or the like in a multi-user game environment over an ISP network linked with handheld game playing devices for updating a game database or a game score from the game server's database. There is a further need in the art to provide a game playing hardware and software platform for game developers for multi-user game environments.

SUMMARY OF THE INVENTION

The apparatus of the present invention satisfies the needs of the marketplace described above and also solves other problems that will be understood by those skilled in the art upon reading and understanding the present specification. The present invention is a system and method for real time data exchange which includes a game server having a multi-threaded multi-processing operating system and located at an ISP head end. The game server is equipped with a back end communication system for full duplex communications over the Internet. The system employs a plurality of personal computers each having means for connecting to the Internet and logging onto the game server, together with a plurality of handheld game playing devices each having a data communications link to one of the personal computers.

Each of the personal computers has a first component of game software operating thereon. The game server has a second component of game software operating thereon and a game database operating thereon. The second component of game software includes first, second, third and fourth process threads. The first process thread is operable for receiving uplink communication packets to register and log in to the game database on the game server from each of the handheld game playing device through the data communications link and the Internet. The second process thread is operable for sending downlink communication packets to specific game software on any one of the personal computers. The third process thread is operable for receiving uplink communication packets from specific game software on each of the personal computers. A fourth process thread is operable for sending downlink communication packets to any one of the handheld game playing devices that include data from the game database.

The first component of game software includes means for executing the first process thread for receiving communication packets and means for executing, after logging onto an online game, a plurality of game processes. Each game process is capable of executing a second component of a specific game process and each is logically connected to the second and third process threads for transmitting and receiving uplink and downlink communications packets and has means for, after completion of game playing, executing the fourth process thread for sending communication packages to update data from the server's game database into each handheld game playing device through respective personal computer data communications links. The data communications link may be a cable, an IR link, or an IrDA link in various embodiments of the invention.

Some embodiments of the invention include the combination in a system for processing inputs from a plurality of handheld game apparatus. The system includes a first handheld game apparatus, including means for data input and data output and a first PC apparatus, including means for data input and data output. The first PC apparatus includes means for connecting the first PC apparatus to the Internet and means for data communications with a plurality of handheld game apparatus. A game server includes means for connecting to the Internet. The game server has a game database and game software operating thereon. Data is transmitted from each of the handheld devices to the first PC apparatus and then to the game server.

Additional embodiments may further include a plurality of additional PC apparatus each including means for connecting each of the PC apparatus to the Internet and each including means for transmitting data. The system may further include a plurality of sets of handheld game playing apparatus wherein each set communicates with one of the PC apparatus. The means for transmitting data from each of the handheld devices to the PC apparatus may be a cable, an IR link or an IrDA link.

Some forms of the invention provide a multi-user game playing system for providing game playing services to Internet service subscribers. The system includes a plurality game players PC apparatus each having at least one handheld game playing device in communication with a data input thereof. Each of the game players PC apparatus is disposed at the end of an ISP network connection. A first game playing server is located in another ISP head end and is equipped with a network card for data communication over the Internet network with a plurality of game players PC apparatus. A plurality of processes operate on the game playing server to communicate with the game players personal computer and the handheld game playing devices in communication with respective PC apparatus. A plurality of software processes operate on the PC apparatus to communicate from one handheld device to another handheld device via a PC apparatus and from one handheld device to a PC apparatus. The system further includes means for sending a game players registration information from a handheld game playing device to one of the PC apparatus and then to the game server through the Internet.

In some forms of the system, after verification of registration information for a specific handheld device game, software components are loaded at the PC apparatus that is in communication with the particular handheld device.

Some forms of the apparatus in accordance with present invention exchange only game control information between the PC apparatus and the game server to allow high-quality graphics display at the PC apparatus. Some forms of the system further include means to allow users of the handheld devices to log in, play, change and quit each of a plurality of games. Each of the plurality of games may be a concurrently operating game in a separate process in a multitasking environment, while each of the operating threads are event-driven context-switched threads to control user access and communication over the Internet network.

Game playing information and game access information may be exchanged between the game server and each of the PC apparatus using the TCP/IP protocol. In some forms of the system both before and after game playing, a player's playing score or data from server's game database is updated to each handheld game playing device. The game server may include a plurality of network cards and the game server may have a distributed processing design in which processors in the network cards relieve the server processor from much of the communication overhead. In some forms of the invention the handheld gaming devices includes means to operate in a standalone mode.

Each of the handheld devices may include means to function with another handheld device independently of a PC apparatus and independently of the game server. The system may include means in the handheld devices for uploading scores of standalone playing via the Internet to the game server. The handheld device may include means for each of the handheld devices to function as a joystick for the PC apparatus during game playing. The communications link between each of the handheld devices and a PC apparatus may be a serial data communications link. The protocol used by the game server may be TCP/IP.

BRIEF DESCRIPTION OF THE DRAWINGS

The invention will be better understood by reference to the drawings in which:

FIG. 4 is a block diagram of the client data structure of Part A of FIG. 3.

FIG. 13 is control flow diagrams showing the communications and process flow between the users and the server to join, play, change and quit any number of a plurality of provided games.

DESCRIPTION OF THE PREFERRED EMBODIMENTS

Figure 1:
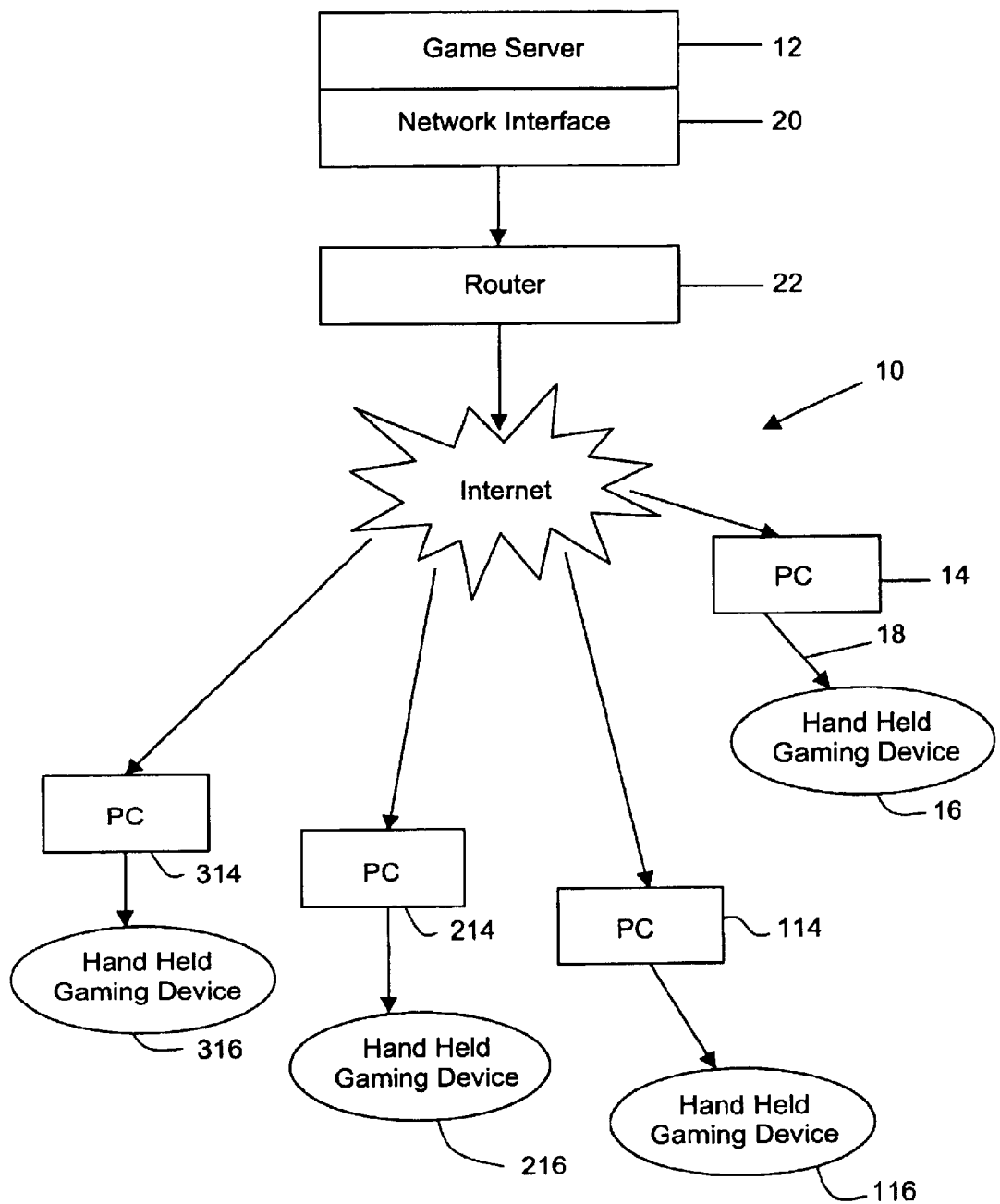
FIG. 1 is a block diagram of the multi-user game-playing network, including a single game server located at the ISP head end and a plurality of users located at the user sites using computers and handheld gaming devices.

Referring now to FIG. 1, the present invention includes a complete multi-user game playing system 10 that provides game-playing services to Internet service subscribers over an existing ISP provided TCP/IP network. A game player located at the end of an ISP network connection has a computer 14 and a handheld game playing device or handheld device 16 attached to an RS232 connection (not shown) of the personal computer 14 via cable, IR or IrDA (indicated schematically by the arrow 18). A game playing server or game server 12 is located in another ISP head end and is equipped with network card or interface 20 for full duplex communication over the Internet network with a plurality of game players. The apparatus for operation by three players is indicated in FIG. 1 diagrammatically by respective computers 114, 214, and 314 which property respectively with handheld gaming devices 116, 216, and 316. As in the case of the computer 14 and the handheld game playing device 16, each of the computers is connected to a respective handheld game playing device 16 by an RS232 connection via cable, IR, or IrDA. In other embodiments of the invention other wireless and wired communication structures may be utilized.

Multiple processes are used by the game server 12 to communicate with the game players' personal computer 14, 114, 214 and 314 and handheld game playing devices 16, 116, 216 and 316 and the game players (not shown). Multiple processes in any one of the game players' personal computers 14, 114, 214, 314 are used to communicate from the game players to other game players' personal computers 14, 114, 214, 314 and handheld game playing devices 16, 116, 216, 316 . Game players registration information is sent to the game player's personal computer 14, 114, 214, or 314 from a handheld game playing device 16, 116, 216, 316 through an RS232 connection via cable, IR or IrDA, then to the game server 12 through an ISP's TCP/IP network that includes a router 22. After matching a player's information, game software components are loaded at the user site (such as the PC 14 and the handheld gaming device 16) and at the head end site (namely the game server 12). Only game control information is exchanged between the respective sites to allow high-quality graphics display at the user site without the need to exchange complete graphical information to each user. A communication polling technique is used which is tolerant of an unreliable communications medium (as in the case of a dialup Internet connection) and which functions in spite of lost data.

The present invention also relates to a real-time operating system that performs multi-threaded processing of multiple data requests and multiple data responses in a game playing communications network and system. Before game playing and after game playing, a player's playing score or data from a game database located on a game server is exchanged between the game database on a server and the handheld game playing device 16 through a TCP/IP network and the personal computer RS232 connection via Cable, IR or IrDA. The present invention also includes a real-time data exchange system of Internet games to update data for a handheld game playing device 16 using a personal computer RS232 connection via cable, IR or IrDA. The operating system allows users to log in, play, and change and quit any number of a plurality of provided games. The user may switch between games but only one game may be in active mode at any one time. Each of the plurality of concurrently operating games is a separate process in a multitasking Internet server environment while each of the operating threads are event-driven context-switched threads to control user access and communication over the Internet network. The game playing information and game access information is exchanged between the server and the plurality of the game players using the TCP/IP protocol that is very tolerant of lost packet data. Before and after game playing, a player's playing score or data from server's game database is updated to a handheld game playing device 16 through the personal computer RS232 Connection Via Cable, IR or IrDA. The user's game equipment attached to the Internet network includes devices such as a personal computer and a handheld game playing device 16. The server platform is a distributed processing design in which processors in the network cards relieve the server processor from much of the communication overhead, and the server group can be upsized to accommodate more processes as the result of an increased number of users.

The complete multi-user game playing system in accordance with the invention provides game playing services to Internet subscribers over existing Internet service provider networks (ISP). A game player located at the end of an ISP network connection has a computer linked to the ISP network through a telephone line or wide bandwidth line. A handheld game playing device 16 is used to link with the computer through RS232 connection via cable, IR or IrDA. The handheld game playing device 16 can provide storage and game function while standalone, and the score stored can be uploaded to the Internet for a second part of the game. A game-playing server is located at another ISP head end and equipped with back end communication system for full duplex communications over the ISP network with a plurality of game players.

The multi-user game-playing server includes hardware and software where the game server 12 includes a multi-threaded operating system that controls user access to a plurality of concurrently operating games. The operating system allows users to join, play, and change and quit any number of a plurality of provided games. Each of the plurality of concurrently operating games is a separate process in a multitasking environment while each of the operating threads are event-driven context-switched threads to control user access and communications over a TCP/IP network. The game playing information and game access information is exchange between the server and the plurality of the game players using the TCP/IP protocol that is very tolerant of lost packet data. Before or after game playing, each game players updates beginning or ending score from the online game to the handheld game playing device 16 through a Personal Computer RS232 Connection via cable, IR or IrDA. The user's game equipment attached to the ISP network includes personal computers with TCP/IP connection, RS232 communication port and handheld game playing device 16.

System Overview

The present invention is designed for connection to the existing infrastructure of an ISP network. A game server 12 computer is attached to the ISP at the operator head end using the TCP/IP protocol in the preferred embodiment. The users' or subscribers' handheld gaming device 16 is connected with a personal computer using an RS-232 connection via cable, IR or IrDA in the preferred embodiment. In other embodiments of the invention, other communication protocols and physical structures may be utilized to facilitate this communication. The personal computer, in turn, is attached to the ISP network using a dialup or wide-band TCP/IP connection. Ordinarily, however, a wireless connection may be utilized in some forms of the present invention. The subscribers' equipment communicates with the game server 12 at the head end and with other subscribers to allow the subscriber to play any number of games selectable from a library of games in competition with or in cooperation with other users or subscribers on the ISP network. The user site hardware platform may be a personal computer with RS-232 connection, a game console with RS-232 connection or a special set-top terminal. The user site hardware is loaded with a first component of the software with a second component of software running at the server site. The graphics information need not be transmitted from the server site, (with the exception that new graphics information update will occurs on a batch process basis), since the graphics information exists at the users' site. Only status information about the game is transmitted between the sites.

The game server 12 is capable of handling thousands of ISP subscribers in a real time environment in which the response time between a user machine request and the server is bounded. In the preferred embodiment, the system is based on Java, although C may also be used. The advantage of using the Java language is for the sake of portability so the system can reside on either Unix type (Linux, SUN, AIX, etc) or the Windows NT/Windows 2000 operating system. The communications protocol is TCP/IP and the system can operate effectively since TCP/IP is a proven, stable communication protocol.

Hardware Overview

Figure 2:
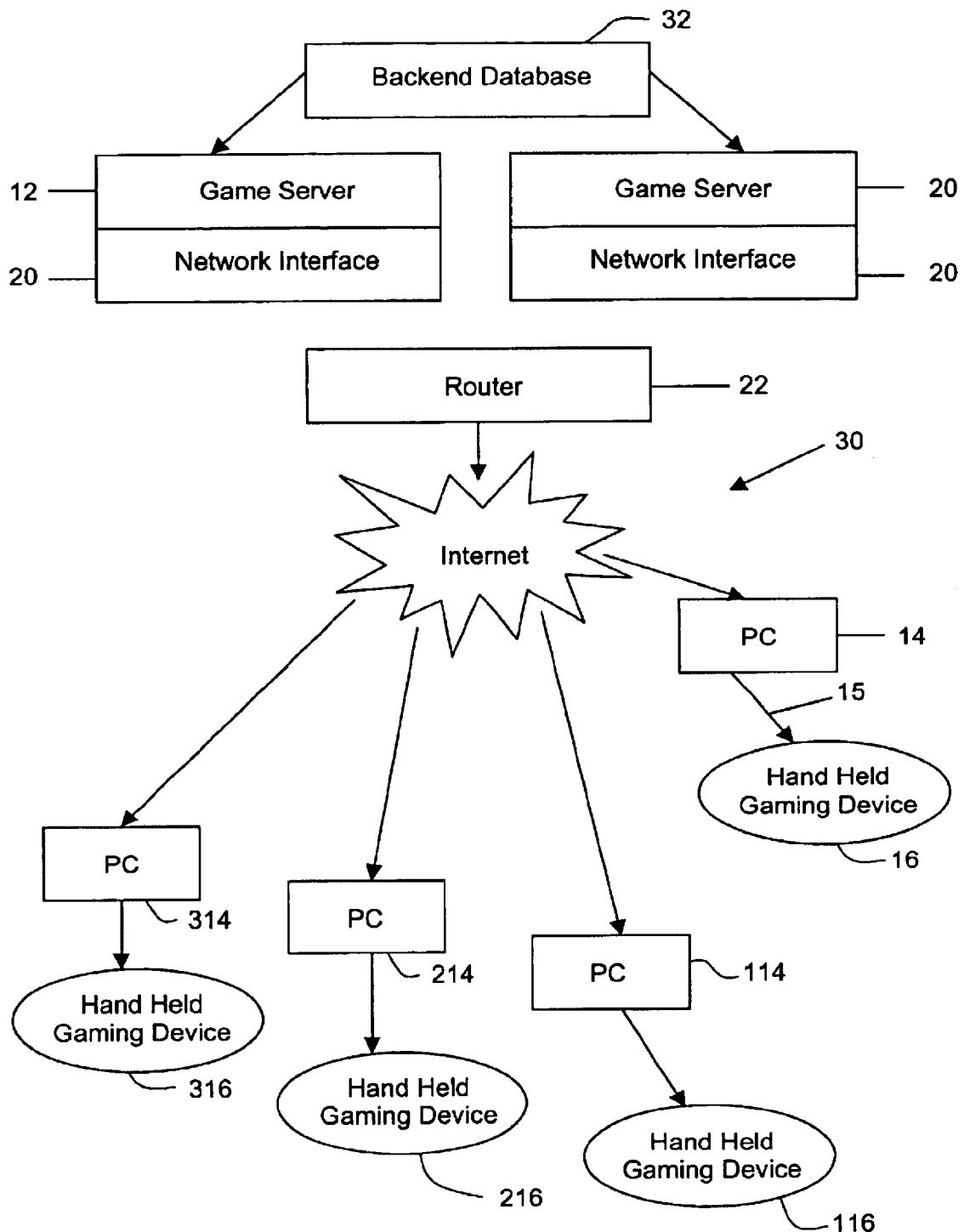
FIG. 2 is a block diagram of the multi-user game-playing network including a plurality of game servers located at the ISP head end and a plurality of users located at the user sites using computers and handheld gaming devices.

A basic implementation of the present invention is shown diagrammatically in FIG. 1 and a larger configuration to handle an expanded number of users is shown diagrammatically in FIG. 2. The game server 12 contains a processor running multi-user game (MUG) playing operating system software. In the preferred embodiment of the present invention, the game server 12 hardware platform is an Intel Pentium III-based computer using single or multiple processors running the Linux operating system. Upon reading and understanding the present specification, those skilled in the art will readily recognize that a wide variety of hardware platforms and operating systems can be substituted for the systems used here. For example, a dual-Intel Pentium III hardware platforms or a SUN machine, or the like, could be substituted to provide the performance needed to implement the present invention.

The game server 12 hardware and software system communicates with the user hardware platforms using a TCP/IP protocol. The game server 12 communicates over the ISP network with user platform using a plurality of processes. Each user hardware platform also equipped with modem or network card that is TCP/IP connection capable. Also, a handheld device 16 connecting using RS-232 connection via cable, IR or IrDA is used for part of the game play during standalone mode and the score can be uploaded to the PC and the Internet and play the other part of the game. The PC link is built between the PC and handheld device 16 by use of UART serial port. A UART is preferred because nearly all personal computers have it as a connection interface. Also, many 4-bit or 8-bit microcontrollers are equipped with a UART communication port. Hence, it is very natural to select UART as connection method between the PC and microcontroller inside the handheld device 16. The PC side software can either upload or download the characters and their information to the handheld device 16. The selection of either one of these two actions is done on the PC. The information to be transmitted includes, but is not limited to, serial no., character ID, Attack points, Defense points, and Magic points. The data delivered are wrapped into a packet form and communicated with a delicate protocol.

As noted above, the system 30 illustrated in FIG. 2 is intended for a greater number of users. It is similar to the system illustrated in FIG. 1. However, this embodiment utilizes server clustering. The embodiment illustrated has two game servers 12, although other embodiments may have additional game servers 12. The game servers 12 are supported by a back end database 32.

PC Link Hardware

The main function of the PC link hardware is to convert the voltage signal level from +12V at the PC side to a value intermediate 0V to 3V (or 0V to 5V) at the microcontroller side. The key component to perform this function is a zener diode that prevents the voltage from exceeding 3V. The transmit signal "PC Tx" from PC side is clipped to 3V with the aid of NPN bipolar transistor and feeds into the microcontroller On the other hand, the received signal "PC Rx" is sent from the microcontroller and the signal is amplified to 12V with the aid of PNP bipolar transistor and the PC receives the signal.

Handheld Device Hardware

The hardware of the handheld device 16 consists of a microcontroller, an LCD display and other solid-state components 4-bit microcontrollers are preferable because they are very compact design and are very suitable for the gaming purposes. More specifically, such microcontrollers provided nearly all required functions such as an LCD driver, an LCD controller, a buzzer driver, a UART driver etc Accordingly, the hardware design time can be reduced greatly, with a result of a very lean design that can effectively reduce the scrap rate during assembly.

UART Setting

The baud rate and data format can have a number of suitable parameters available because of the flexibility of the UART configuration. And for game parameter transmission and joystick function, the UART data format may be 8 bit, no parity bit and 1 stop bit with baud rate of 1200 bps.

Software Overview

Polling Protocol and Session Protocol

Figure 8:
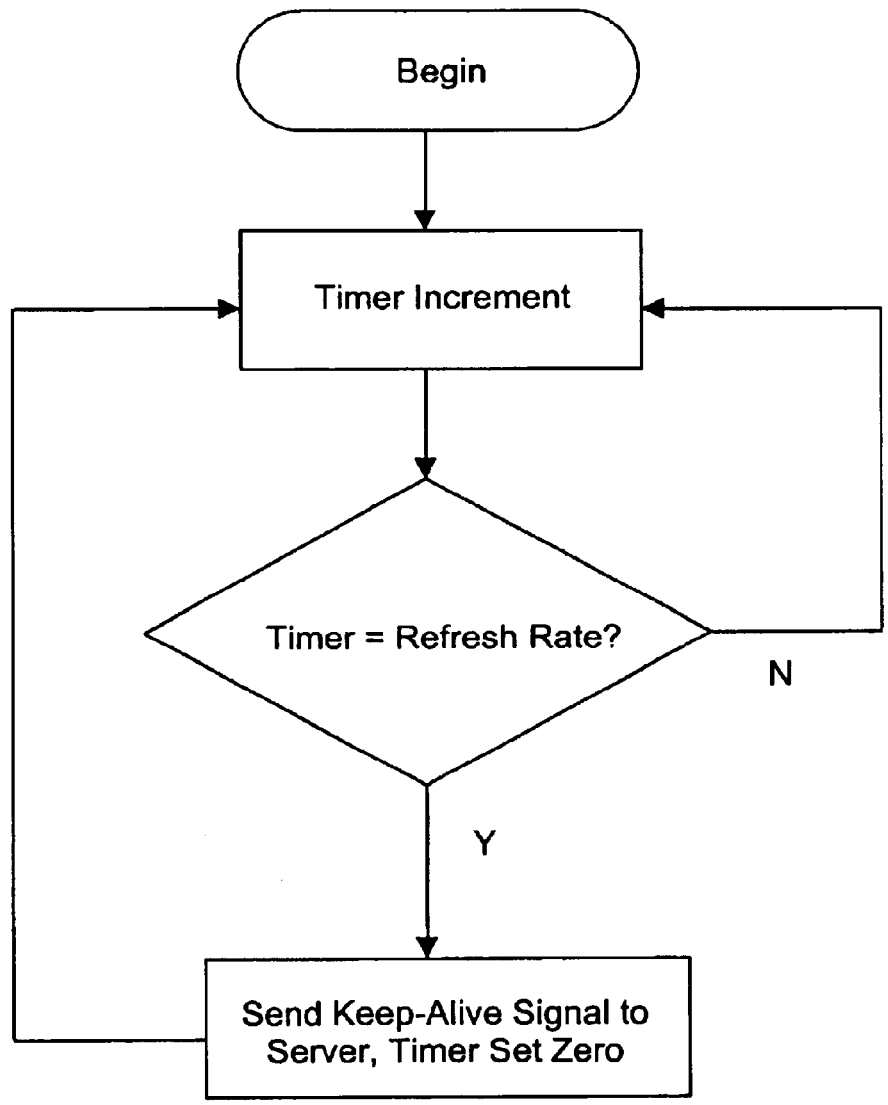
FIG. 8 is a diagram of polling algorithm/keep alive protocol used by the PC based on the TCP/IP protocol.

FIG. 8 is the diagram of the polling algorithm used by the game component operating in users' computer. Since the Internet connection for the users may be lost, especially in the case of modem connection to the Internet, during game play, polling algorithm can ensure the disconnection can be detected and suitable response can be programmed for abandoning or recovering the game. In the server side, a time out algorithm in the session protocol is also used for detection of loss of connection of the game players.

Operating System Threads

The game operating system in the present invention is written in Java code to maintain cross-platform functionality in the present invention. In the present system, a game communications cycle between a user to another user or to the server is equal to half the round-trip time, which is around 100–400 ms, and is about the response time of arcade type game playing. The tasks performed by the operating system are divided into threads. One group of input threads handles the communication input, and another group of output threads handle the communications output. A multi-threading operating system facilitates concurrent application design. In operating-system terms, a running application is called a process. Each process consists of at least a single thread. A thread is a unit of code that can get a time slice from the operating system to run concurrently with other units of code.

TABLE 1

System Operating threads

T1-Dispatcher Thread
T2-Timer Thread
T3-Game Server 12 Communication Threads

As shown in Table 1, a plurality of threads (in Java language) is used to handle the operation of the server. There is one dispatcher thread (T1) for incoming request and to deliver the request and parameter data for game operation. When a particular thread is not needed (i.e., there is no incoming request for log in), the thread is dormant or destroyed as handled by Java VM. The dormant threads accounts for less system resources than active threads and allows the system to service other threads and games processes.

The server uses an http-session for sensing time out of users and thus to track inactivity of users. This is important for the system since time-out for inactivity can schedule free up of system resource for connection-lose users and thus increases system stability. The http session time out is carried out by Java VM's system timer thread (T2). Each game server 12 communication thread T3 is called by the game application when sending information from the server to the users personal computer' or vice versa. The server part of the game application software runs as a layer over the operating system and is restricted from accessing privileged instructions or low level control of the system. Since the game applications need to communicate with users and the operating system, the operating system the game system resides on provides the communications services via threads T3.

System Threads and Game Process

The game processes are part of the multiprocessing environment and are also implemented as light weight threads residing in the server. Each game application is defined as a 'web-application' in the server. The advantage of each is shared data segment within the server and is 'lightweight' so the startup and shutdown of threads is faster than generating a new process to handle requests from the user, thus enabling a faster response from the server.

The multiple threads of the present invention are the preferred method of handling the communication control. Since the present game design is a multiple-user game, the game processes is also multi-threaded for handling user requests efficiently as the game server 12 has a large part of time doing update of game status such as the parameters of users or the location of the users. The game server 12 hardware platform in the preferred embodiment contains sufficient main memory to allow the maintenance of all the game processes in main memory so that context switching between game processes is relatively fast. There should be no unloading of game processes to secondary storage between context switches. If the game server 12 hardware does not handle context switches fast enough due to processing power limitation or memory limitation, server clustering and multi-tier client-server techniques should be employed for maximal performance.

User-to-User Communication Thread

There exists another thread in the present invention, the User-to-User communication thread. Such implementation is advantageous because in a multi-user game environment, speedy communication may be needed between two computers such as the case of fighting games. If all the status communications between two personal computers are through the server, the communication time will at least doubled, or may be delayed more for slow server connection. Also, this kind of communication can be configured to reduce the total traffic and server loading of the game system, as in the case of car racing game. The communication will be established when two players' locations are very near and the rate of communication will be at a larger rate in order to determine the 'position', but the communication is not needed at high rate when the players are very far apart, and only the normal user to server communication is needed at a lower rate. In preferred embodiment, it is provided in a pair of client-server process and is described in FIG. 12.

Data Structures

Figure 3:
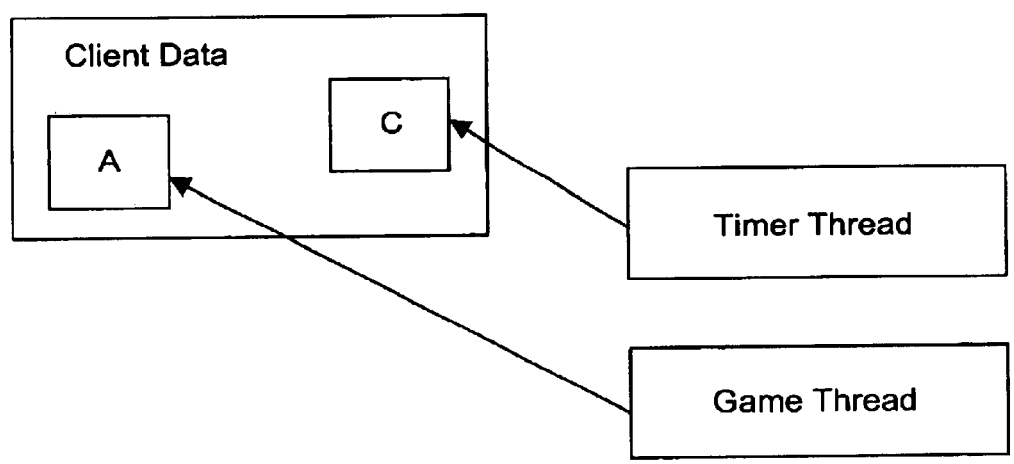
FIG. 3 is a diagram of the data structures and their relative connections used by the multiple threads of the control software of the real time operating system.
Figure 4:
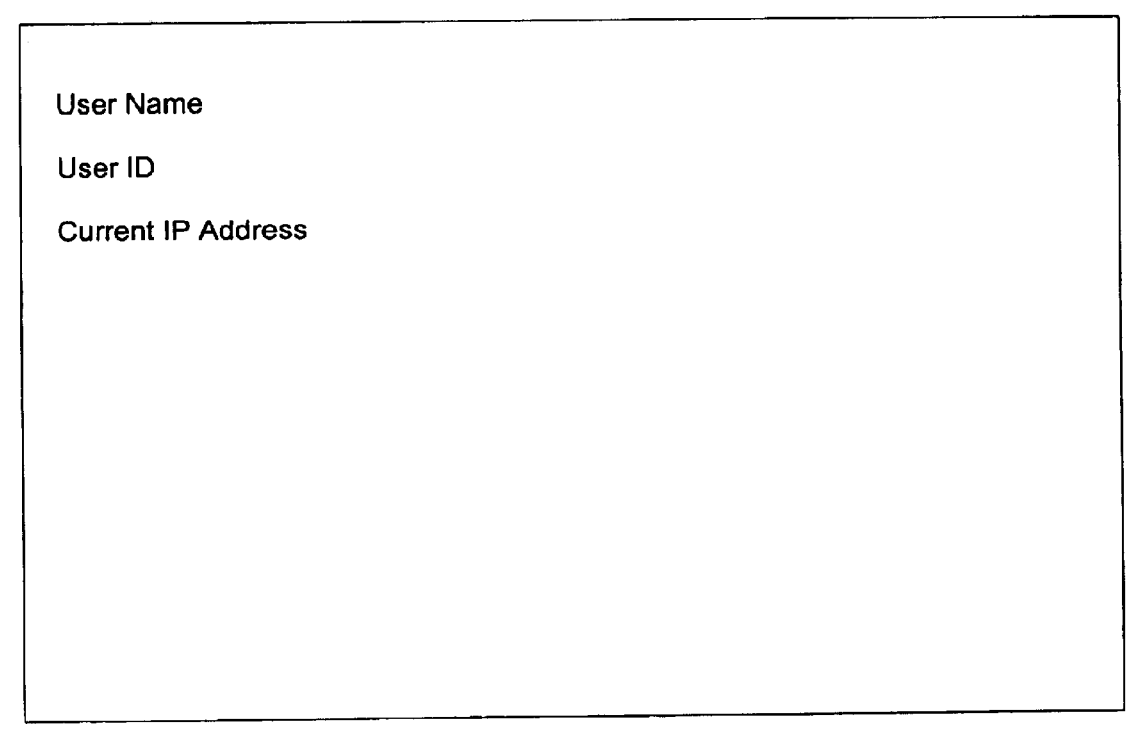
Figure 5:
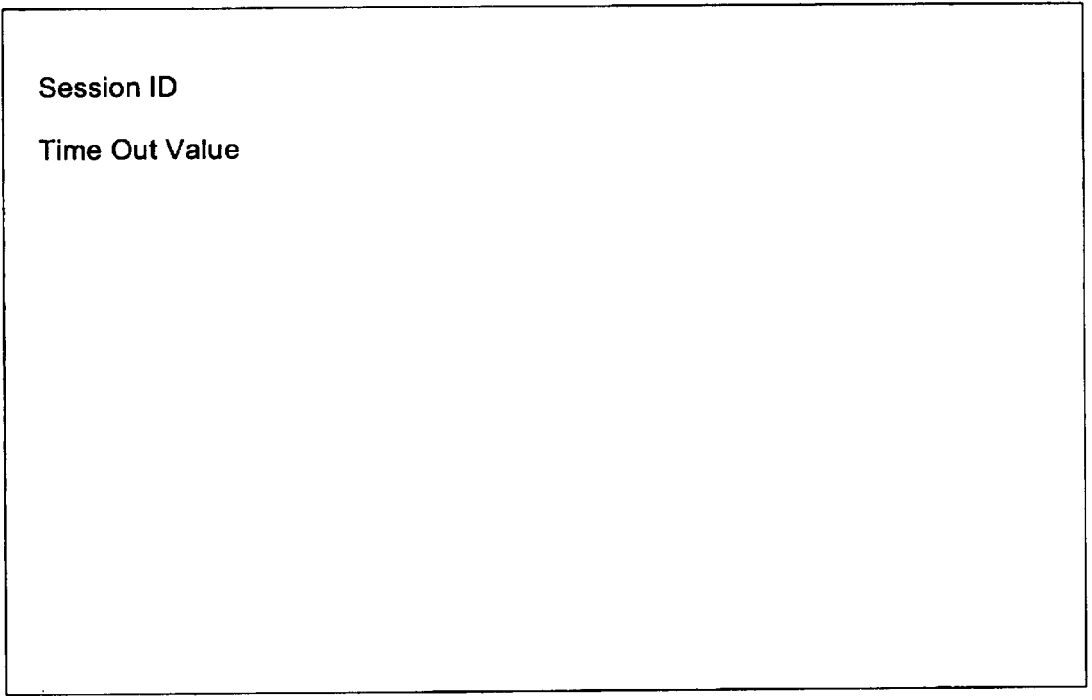
FIG. 5 is a block diagram of the game instance data structure of Part C of FIG. 3.
Figure 6:
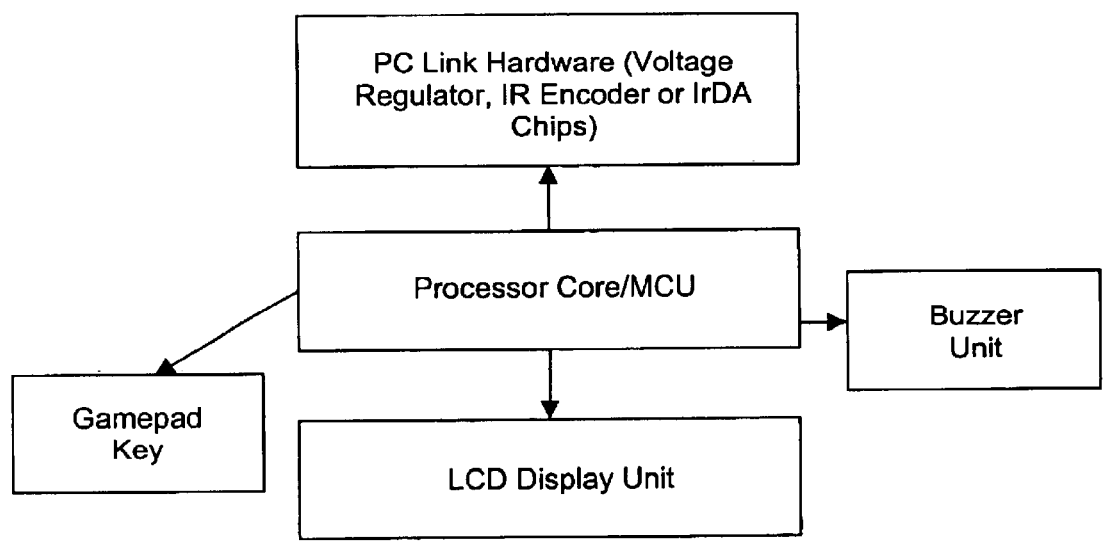
FIG. 6 is a block diagram of the handheld gaming device data structure.
Figure 7:
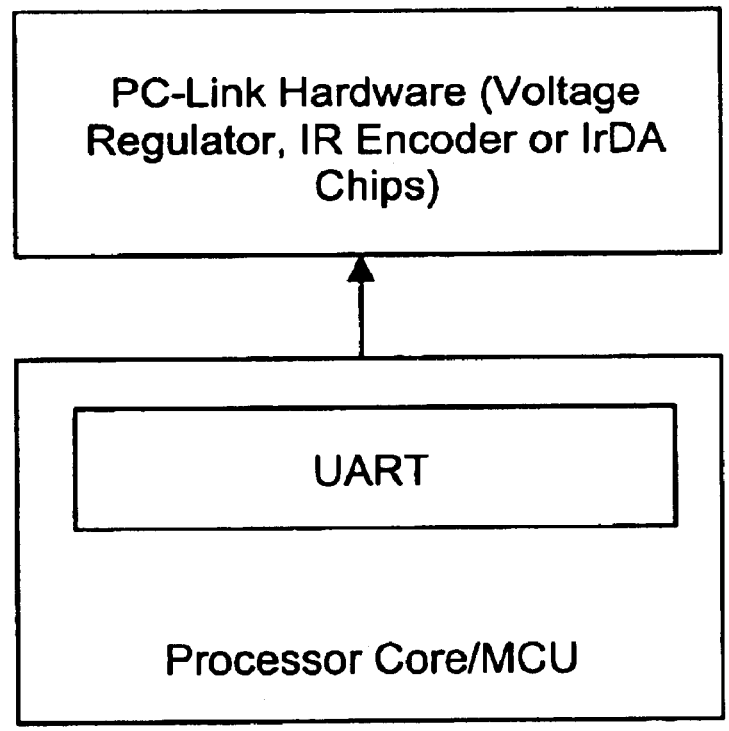
FIG. 7 is a block diagram of the communication interface between a handheld gaming device and a personal computer.

Referring to FIG. 3, the data structures of the threads of Table 1 are shown diagrammatically. All threads shown in Table 1 access the data structures of FIG. 3. The Client Data is shown in FIG. 3, and is shown in more detail in FIG. 4 and FIG. 5. In FIG. 4, the user ID is stored in a session object instead of device identity. The device identity is the serial number of the handheld gaming device 16 attached to a specific user hardware platform. The device 16 is distinguished from a game player since each game player may own more than one handheld gaming device 16 and attach to the user hardware platform to connect to the Internet at different time. The device 16 identity can also be used in replacement of the user ID if each device 16 has a different password. In this case, a device list is formed and the purpose of the device list is to provide a central set of information about each device including status, device ownership, etc.

The use of the Data Structure is best shown by way of example. In a communications transaction, a message packet may come from a game player ID 200 and may be intended for game log in. The server system will therefore attempt to first ensure that game player ID 200 does exist, and has been registered before the server delivers the message packet to the game process threads. After that, a 'HTTP session' data object is created with a unique session ID, and the session ID is returned to the game player's system. All subsequent transactions will include the session ID and are transmitted via secure channel (e. g. SSL). The use of the HTTP session data structure enables faster transactions since password authentication, which involves reading data from database, can be avoided by using correct IP address and session ID matching.

Software Flow Charts

Figure 9:
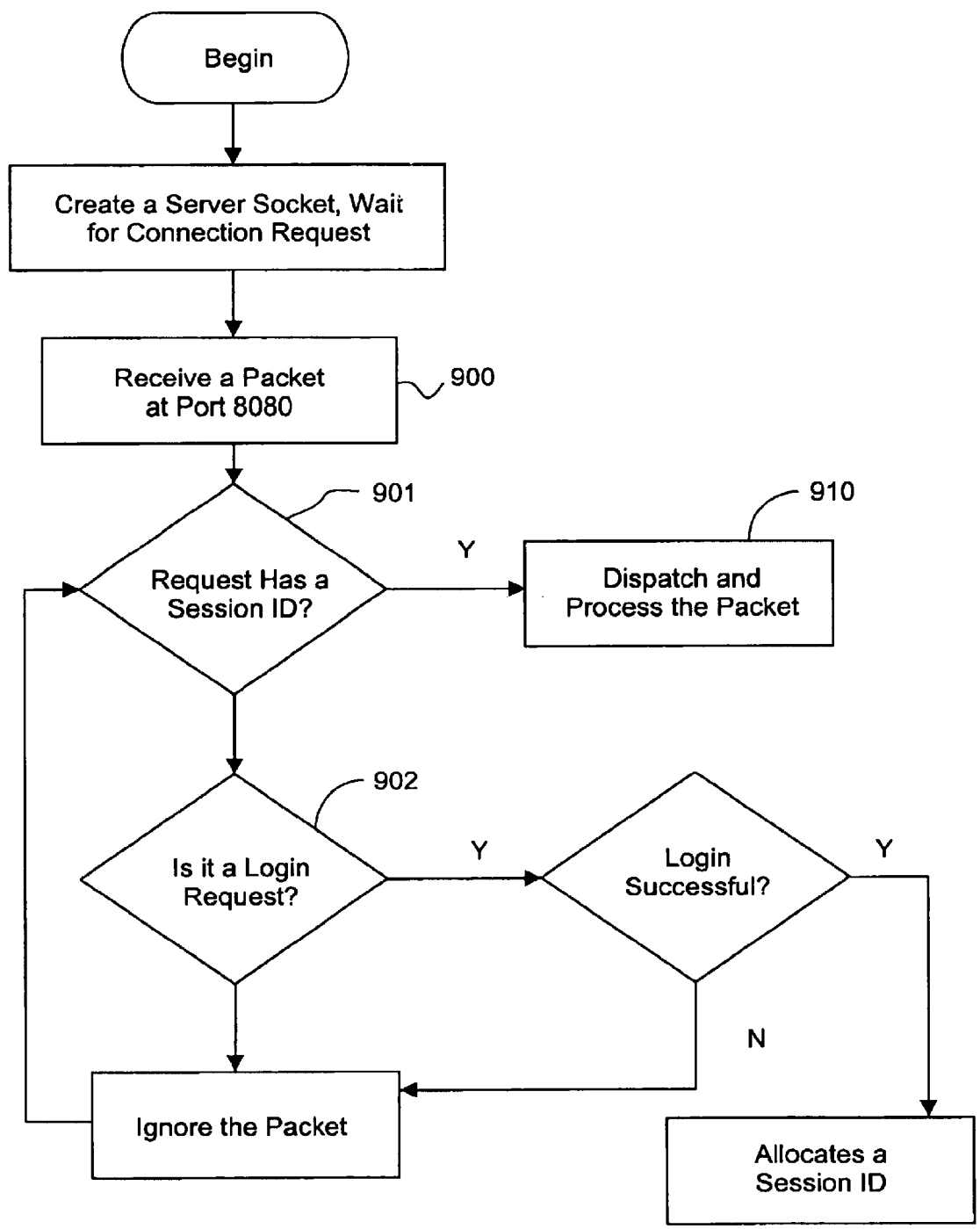
FIG. 9 is a software flow chart for the T1 processing thread of the dispatcher algorithm that receives and processes the data packets from the users.
Figure 10:
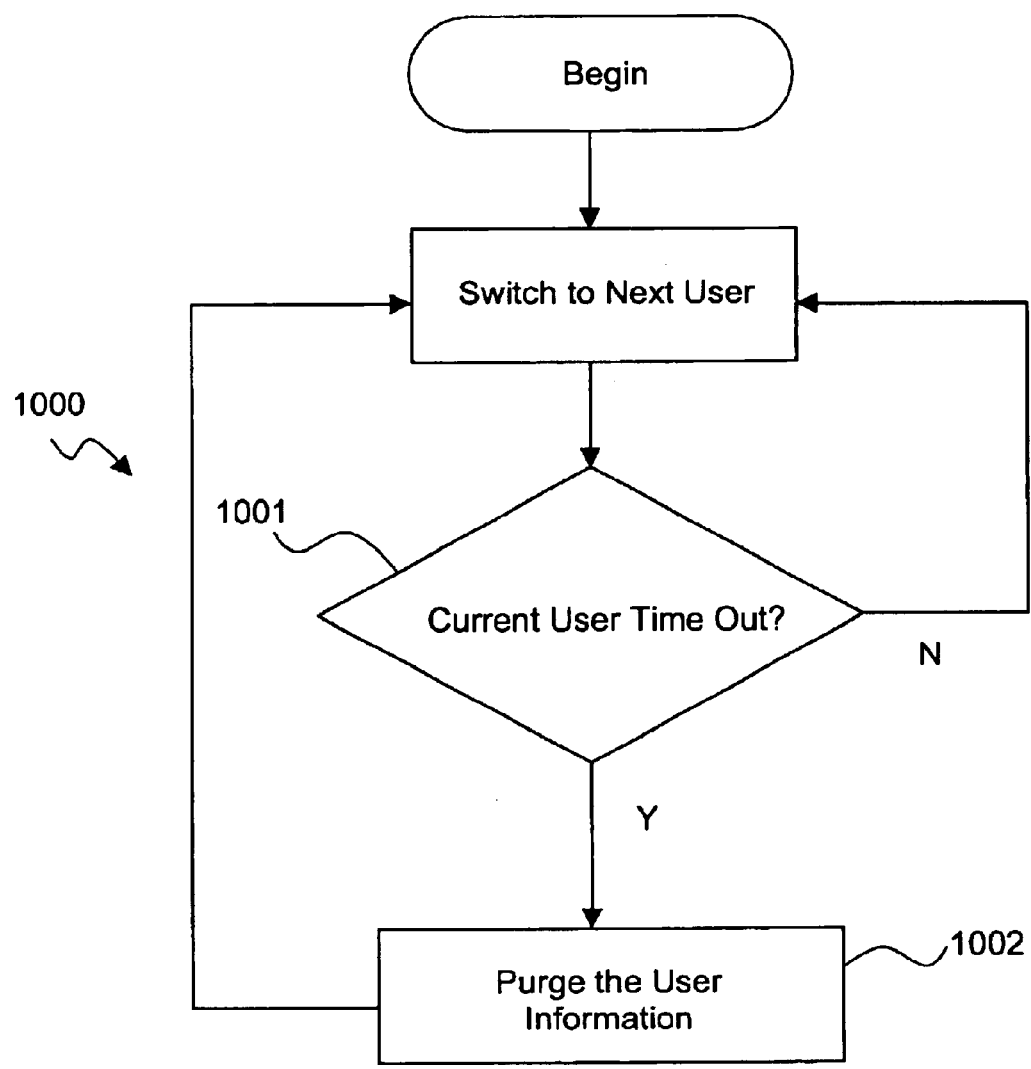
FIG. 10 is a software flow chart for the T2 timer algorithm that monitors the online status of game players.
Figure 11:
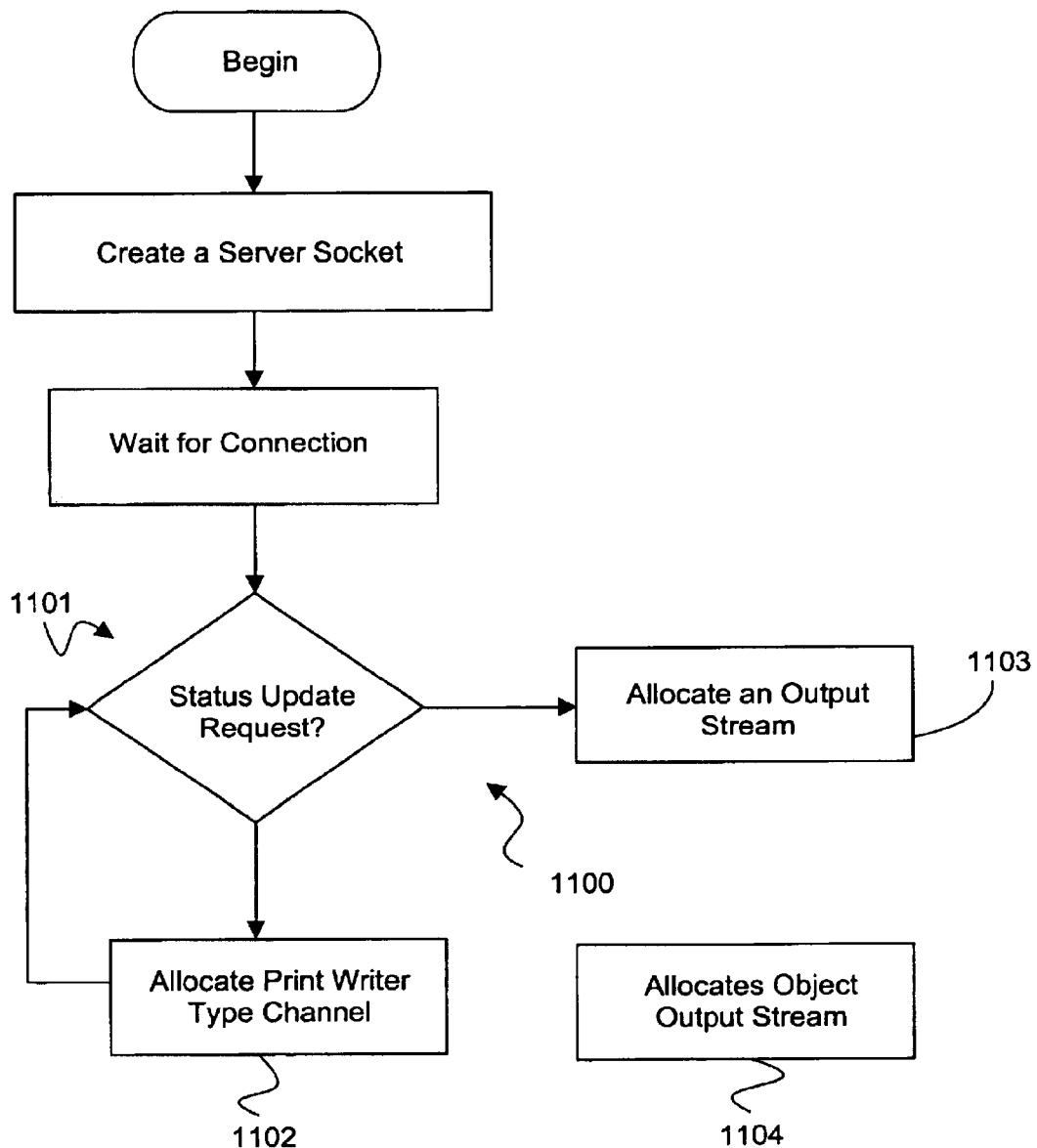
FIG. 11 is a software flow chart for the T3 switch algorithm processing thread that allocates different types of communication channels based on TCP/IP for different kinds of communication needs during game play.
Figure 12:
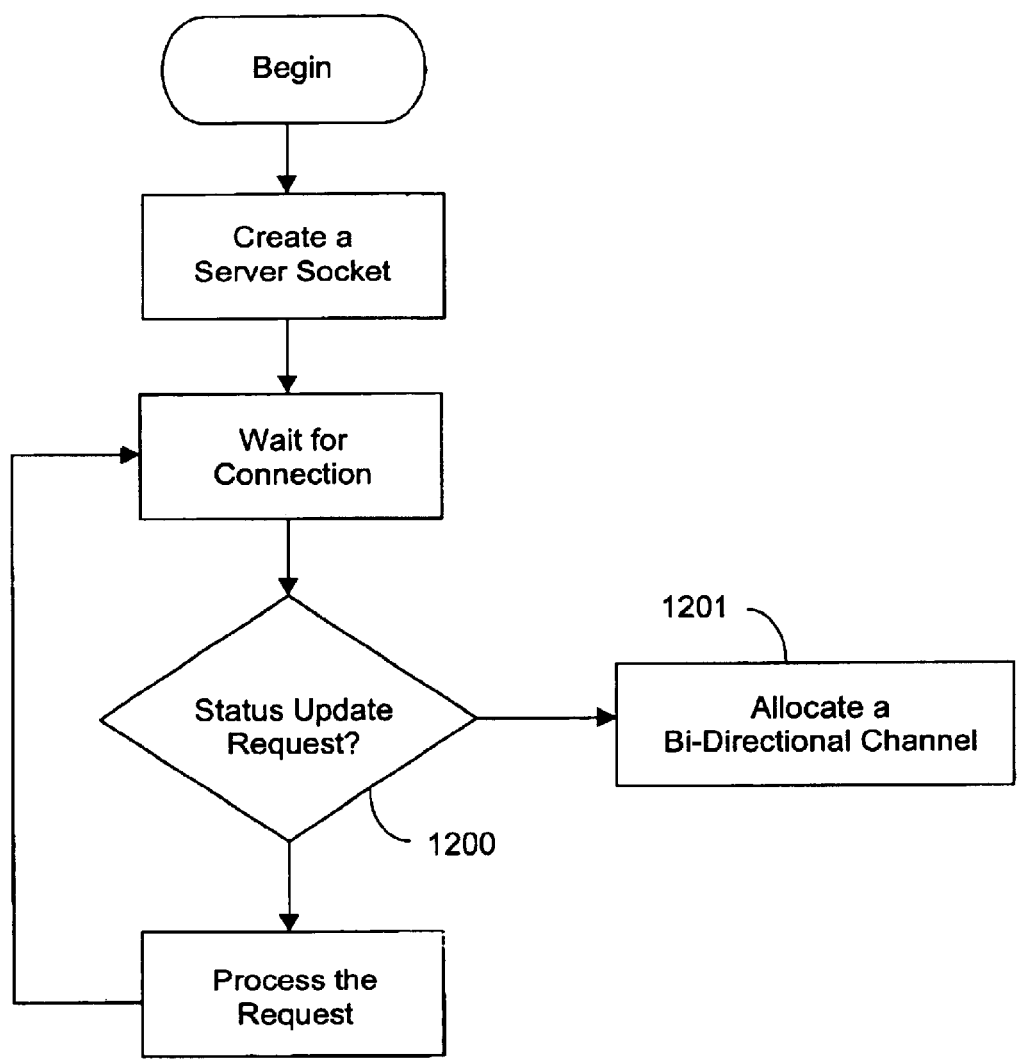
FIG. 12 is a software flow chart for the user-to-user processing threads.

The operating system software is described in detail in the flowcharts of FIGS. 9 through 11. The control flow diagram of the operation and interaction between two user hardware platforms is shown in FIGS. 12. The flow charts describe the operation of the threads T1–T3 and are drawn in a fashion that describe high-level operation. Became these flow charts describe operating system threads, they do not necessarily show a termination point or exit point. The exit point on these flow charts is anywhere the process completes at a square instruction box

T1 Dispatcher Thread

FIG. 9 is a software flow chart for the T1 processing thread of the dispatcher algorithm that receives and processes the data packets. The control flow of the T1 thread has been designed to maximize efficiency in handling the data packets in the least amount of time. The T1 thread "sleeps" until the communications card indicates a packet has been received at port 8080. The receipt of the packet at port 8080 is the event that "wakes" the T1 thread to process the packet. The T1 process thread of FIG. 9 has been carefully designed to handle corrupted packets. Corrupted packets including packets sent by hackers which contain illegal requests or parameters may cause harm to the game process. Accordingly, the system continually checks to see if an illegal request is being made.

In FIG. 9, the receipt 900 of a packet at port 8080 awakens thread T1. Since the game applications are defined as 'web applications', the packet is dispatched automatically to a different game application. For each game application, after receiving a packet, the first decision 901 is to analyze the packet to see if the client indicated in the packet has been allocated a session ID. If not, control is passed to box 902 to determine if this is a log in request. If there is no log in request and the client has not been allocated a session ID, then the packet is ignored and the process returns to read the next packet at 900 or to sleep. If the packet is a log in request at 902, then a session ID is allocated to the client if the log in process is successful. After the session ID is allocated, the thread is terminated.

If the session ID is attached in the request and is valid, control is passed from decision box 901 to decision box 910 where the request is dispatched to different threads for the game operation. If the command of the request is found invalid, a no-response situation will be returned.

T2 Timer Thread

FIG. 10 is software flow chart for the T2 processing thread of the timer algorithm that determines the timeout of events. The timer thread is a low-resolution timer so that not much CPU resources are consumed in keeping track since only the resolution of seconds is needed. The time out value that determines the time elapsed before a time out occurs is set through the Java API.

Referring to FIG. 10, the major loop 1000 operates for every client or user of the system. The activity of every user is monitored and if a client or user is inactive for a preset period of time (different for every game), the client/user will be purged from the system as a time out situation. Thus, for every client in the system, the question of decision box 1001 is asked to determine a time out situation If a timeout situation for a user is reached, the timer at box 1002 will purge the user through the system. For the case that the user pauses the game, since it is desirable to keep the session, the polling thread of the game will send keep-alive requests to the server at an interval smaller than the time out value in order to keep the session from purging from the system.

T3 Game Server Communication Thread

FIG. 11 is a software flow chart for the T3 processing thread of the algorithm which allocates different types of communication channels based on the TCP/IP/HTTP protocol for the games. The data channels consists of two types. Referring to FIG. 11, the decision branch 1100 operates to request a status update when allocating a communication channel. The question of decision box 1101 is asked to determine the type of communication to allocate. For the case of allocating a Print Writer type communication channel at 1002, it is a simple HTTP type response that is used when responding to a client side update or log in request. For getting structural data, such as data of characters or map, it is desirable to first create the structure at 1103 in the server first, then allocate the second communication type, the Object Output Stream at 1104, which is based on the allocation of Output Stream, and return the object to the client. It is especially efficient when it allocates an array of object (structural data) and returns the array in one transaction, as in the case of map data transmission, since this can prevent the overhead of establishing a connection, which takes more time than transmitting the data itself.

User to User Communication Thread

FIG. 12 is a software flow chart for the User to User communication thread which allocates different types of communication channel based on the TCP/IP/HTTP protocol for the games. The data channels consists of two types. Referring to FIG. 12, the server wakes up when receiving a packet at decision box 1200. The question of decision box 1200 is asked to determine the type of communication to allocate. For the case of Print Writer type communication channel, it is a simple HTTP type response which is used when responding other game players' update of their local status to the current game player. For fighting or other racing, it is desirable to allocate at 1201 the second communication type, a pair of InputStream and OutputStream, since during fighting or racing, a continuous, fast update of status is needed. An InputStream and OutputStream pair, which can prevent the overhead of establishing a connection, can greatly increase the performance. Since the overhead of establishing connections may take more time than transmitting the data when the number of transmissions is large.

Operation of PC-Link

Prerequisite on PC Side

With reference to FIG. 13, the user should select the characters to be downloaded or uploaded to the device 16 by executing the PC software. Or this may be done automatically at the beginning of the game play. Subsequently, the PC will send a "Request" for serial number command to the serial port.

Prerequisite on Device

The device should be changed to PC link mode by pressing selection key. After then, the device will wait for command from PC to its serial port.

PC-Link Communication Flow

Figure 14:
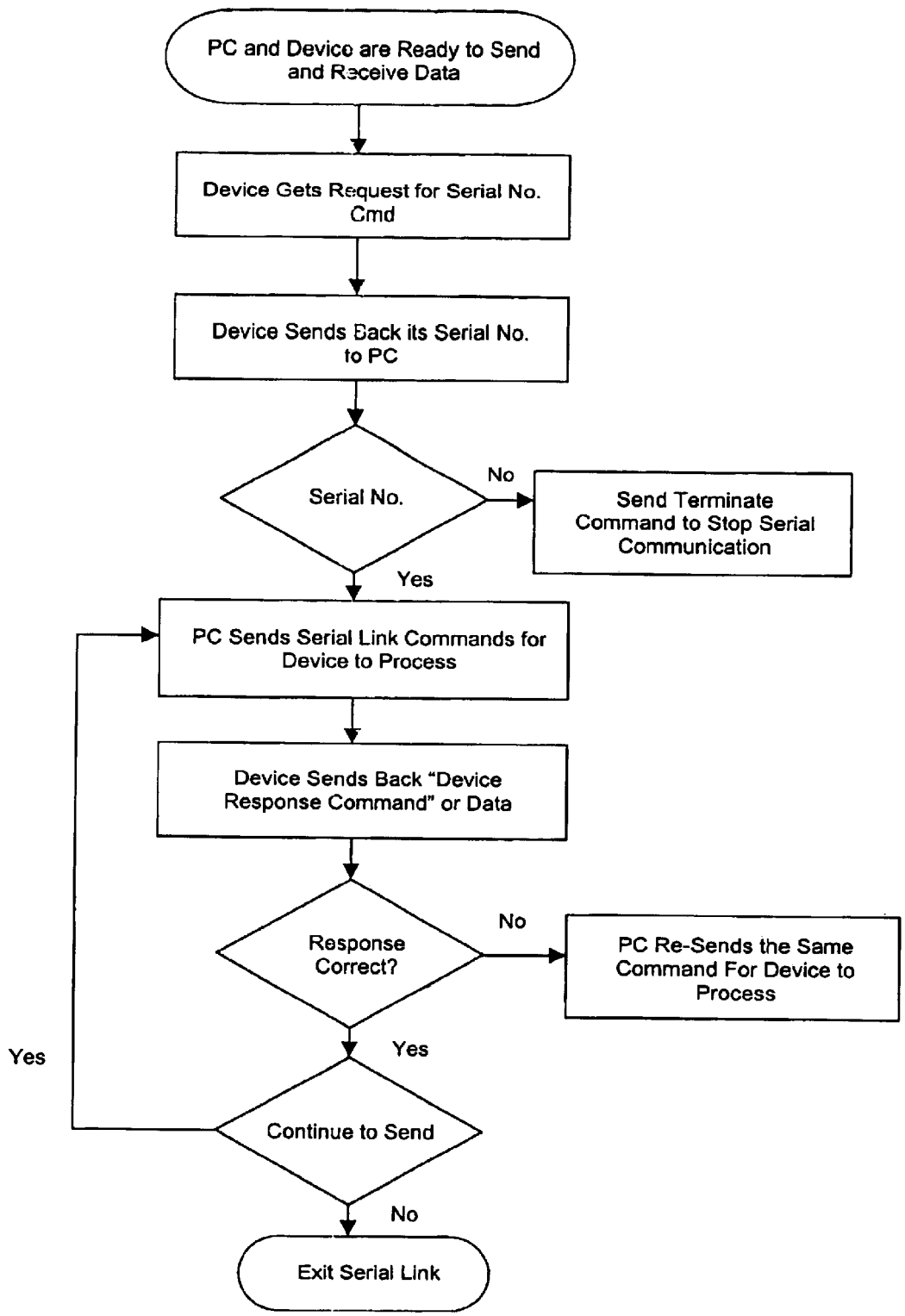
FIG. 14 is the flow diagram for the PC-link protocol.

The communication sequence is depicted in FIG. 14. Initially, the PC and the handheld device 16 are ready to send and receive data, i.e., they have entered into PC link mode. The PC acts as a master and the handheld device 16 acts as a slave. The PC is the first one to trigger the communication and the handheld device 16 gets a request for a serial number command from the PC 14. Then the handheld device 16 sends back its serial number to the PC 14. The PC 14 will check if the received serial number is valid. If the data is not valid, the PC 14 requests the handheld device 16 to send the serial number again until the serial number obtained is correct. Afterwards, the PC 14 can send only available communication commands to read or write data into the handheld device 16. After sending a command from PC 14, the handheld device 16 should give a response packet back to PC 14. The PC 14 will check if the response is what it expects. If it is wrong, the previous command is re-sent again. The communication packet is protected by checksum and if either the PC 14 or the handheld device 16, finds that it is incorrect, a request to resend the same packet is sent again. At the end of the communication, the PC launches an end command to terminate the PC link.

Error Handling

Error on PC

If PC sends a wrong or corrupted command to the handheld device 16, the handheld device 16 will send a Device Response Command back to the PC with status byte signifying the problem. The device is expected to get a correct command in the later time.

Error on Handheld Device

1. Corrupted Data

If the handheld device 16 sends a wrong or corrupted command to the PC 14, the PC 14 will re-send the original request command to the handheld device 16.

2. No Response to the PC

The PC 14 will ordinarily only send the command once and then wait for a response from the handheld device 16. If the device 16 doesn't give back the requested response within a predetermined time period, for example I second, the PC 16 will then re-send the command once more. If the problem still exists after several retries, it is preferred for the PC to send a PC link terminate command and to re-start the communication link again by requesting the user to do so on the PC and device sides.

Game Application Software

Game applications are separate processes that are written to be run within the operating system environment of the present invention. The application software is typically sourced as two components: a server component and a user component. The user component may be written to run on a personal computer (such as an IBM-type PC, an Apple-type computer, Amiga, etc) or a special set-top terminal, which has an RS-232 connection and an Internet connection. The information exchanged between the user site and the server site is status information on the game progress and also update information.

An example of the status information exchanged can be shown in an example of a video game in which the position of the players is critical. The player positions may be indicated in an XY-Cartesian coordinate system such that game player PN is at location PN ($x_N$, $y_N$). To only transmit change information, the motion of player P1 at location P1 ($x_N$, $y_N$) is indicated as a vector (direction and distance). If the message regarding the change in location is lost, all other game players are mistaken as to the true location of the player who changed position and the error compounds itself over time. In contrast to this, the present invention transmits status information in which the new locations of players are sent to each user. Thus, if any status packets are lost during transmission, no loss of position data is evident. The only noticeable anomaly would be that a player's position may jump from one position to another due to an intermediate loss of status information.

The status comes in two forms: status updates and status checksum. The status updates, described above, typically provide status on all game players. The status depends upon the game application, but the information is typically compressed in a code. Status checksums are periodically transmitted which provides a checksum value on the status of all players in a game. This checksum can be compared to the local games status as a shorthand check on the accuracy of the local status. If the checksum doesn't match, the local game can request a global status update from the server.

Game Arbitrator or Referee

Essential to the central control of the present invention is a game referee to make central decisions in a multi-player environment. The user hardware platforms cannot guarantee a fair or correct decision on who would win a particular encounter (such as who shot whom first). Thus, a feature of the game application processes is to make a central decision based only upon the response packets received from the users, and not based upon the speed of the user hardware platform. Since one user may use an Intel Pentium-based processor and another user may use an Intel 80286-based processor, the difference in processor speed should not be a deciding factor. Only the type of encounter and the response packets should be used in determining the winner.

Game Types

A wide variety of game types are available in the present system. Many standard multi-player games are possible to play in the system that number too many to list. By way of example and not by limitation, multi-player games types include a common (simulated) 3-D environment where each user can see and hunt the other users. Two players fighting game, multi-player football, basketball, baseball and other multi-player sport games can also be played. Classical board games and card games may be played. Two player and even single player games can be played. The game may include bulletin board service or messaging games to send and receive information. The game applications may include polls taken of cable subscribers, lottery games, gambling games, movie selection voting, and the like. The term "game applications" as used herein is intended to encompass all types of application games running as context switched processes on the server platform.

Game Environments

An entire game environment or cyber community is possible with the preferred embodiment of the present invention. Separate game applications can be linked though a central environment that could share or pass parameter regarding a particular user. For example, the user could carry points, status, possessions, attributes, etc., from one game to another. This would be very much like walking down a street in a large game cyber community and graphically walking into different storefronts to join different games in a virtual arcade. The cyber community may also provide information services, and mail between users such as leaving messages and information for other users. The present invention may also operate using different communications medium such as fiber optic cabling, wireless communication, analog or digital cellular communications and the like. The present invention supports such an environment and such an environment is envisaged as a product of the spirit and the scope of the preferred embodiment of the present invention.

The preferred embodiments have been described in terms of a cable, IR, or IrDA RS 232 connection between the handheld device 16 and the PC 14. Those skilled in the art will recognize that other connectors and associated interface circuitry such as parallel, USB, or even IEEE 1394 connections with actual wires or even wireless devices may alternatively be used. Still other interface devices and circuits yet to be designed and built will be the equivalents of the apparatus described in the preferred embodiment. Similarly the preferred embodiment has been described in terms of a system that includes a PC. As noted herein, the term PC used herein is not limited to an IBM compatible computer. More specifically, the PC may alternatively be an Apple type computer, and Amiga or any of various other computers or even a special set-top box that has an RS 232 connector or equivalent.

Although specific embodiments have been illustrated and described herein, it will be appreciated by those of ordinary skill in the art that any arrangement that is calculated to achieve the same purpose may be substituted for the specific embodiment shown. This application is intended to cover any adaptation or variations of the present invention. Therefore, it is manifestly intended that this invention be limited only by the claims and the equivalents thereof.

What is claimed is:

1. A system for real time data exchange which comprises:

a game server having a multi-threaded multi-processing operating system and located at an Internet Service Provider, ISP, head end, the game server being equipped with a communication system for communication over the Internet;

a plurality of personal computers each having means for connecting to the Internet and logging onto said game server;

a plurality of handheld game playing devices each having a data communications link to one of said personal computers;

each of said personal computers having a first component of game software operating thereon, said game server having a second component of game software operating thereon and a game database operating thereon, said second component of game software including first, second, third and fourth process threads, said first process thread being operable for receiving uplink communication packets to register and log in to said game database on said game server from each of said handheld game playing device through said data communications link and the Internet, said second process thread being operable for sending downlink communication packets to specific game software on any one of said personal computers; said third process thread being operable for receiving uplink communication packets from specific game software on each of said personal computers; a fourth process thread operable for sending downlink communication packets to any one of said handheld game playing devices that include data from said game database;

said first component of game software including means for executing the first process thread for receiving communication packets and means for executing, after logging onto an online game, a plurality of game processes, each capable of executing a second component of a specific game process and each logically connected to the second and third process threads for transmitting and receiving uplink and downlink of game processes, each capable of executing a second component of a specific game process and each logically connected to the second and third process threads for transmitting and receiving uplink and downlink communications packets and means for, after completion of game playing, executing the fourth process thread for sending communication packages to update data from server's game database into each handheld game playing device through respective personal computer data communications links.

2. The system in accordance with claim 1, wherein said data communications link is a cable.

3. The system in accordance with claim 1, wherein said data communications link is an infrared, IR, link.

4. The system in accordance with claim 1, wherein said data communications link is an infrared data association standard, IrDA, link.

5. The system in accordance with claim 1, wherein after verification of registration information for a specific handheld device, game software components are loaded at the PC apparatus that is in communication with the particular handheld device.

6. The system in accordance with claim 5, wherein only game control information is exchanged between the PC apparatus and the game server to allow high-quality graphics display at the PC apparatus.

7. The system in accordance with claim 6, further including means to allow users of said handheld devices to log in, play, change and quit each of a plurality of games.

8. The system in accordance with claim 7, wherein each of said plurality of games is a concurrently operating games in a separate process in a multitasking environment while each of the operating threads are event-driven context-switched threads to control user access and communication over the Internet network.

9. The system in accordance with claim 8, wherein game playing information and game access information is exchanged between the game server and each of the PC apparatus using the transmission control protocol/Internet protocol, TCP/IP.

10. The system in accordance with claim 9, wherein before and after game playing, a player's playing score or data from server's game database is updated to each handheld game playing device.

11. The system in accordance with claim 10, wherein said game server includes a plurality of network cards and the game server is a distributed processing design in which processors in the network cards relieve the server processor from much of the communication overhead.

12. The system in accordance with claim 11, wherein each of said handheld game devices include means to operate in a standalone mode.

13. The system in accordance with claim 12, wherein each of said handheld devices includes means to function with another handheld device independently of a PC apparatus and independently of said game server.

14. The system in accordance with claim 13, including means in said handheld devices for uploading scores of standalone playing via the Internet to the game server.

15. The system in accordance with claim 14, wherein said handheld device includes means for each of said handheld device to function as a joystick for the PC apparatus during game playing.

16. The system in accordance with claim 15, wherein the communications link between each of said handheld devices and a PC apparatus is a serial data communications link.

17. In combination in a system for processing inputs from a plurality of handheld game apparatus comprising:

a first handheld game apparatus including means for data input and data output;

a first personal computer, PC, apparatus including means for data input and data output, said first PC apparatus including means for connecting said first PC apparatus to the Internet and means for data communications with a plurality of handheld game apparatus;

a game server including means for connecting to the Internet, said game server having a game database and game software operating thereon; and means for transmitting data from each of said handheld devices to said first PC apparatus and then to said game server.

18. The system in accordance with claim 17 further including a plurality of additional PC apparatus each including means for connecting each of said PC apparatus to the internet and each including means for transmitting data.

19. The system in accordance with claim 18 further including a plurality of sets of handheld game playing apparatus wherein said handheld game playing apparatus communicates with one of said PC apparatus.

20. The system in accordance with claim 19, wherein said means for transmitting data from each of said handheld devices to said PC apparatus is a cable.

21. In combination in a system for processing inputs from a plurality of handheld game apparatus comprising:

a first handheld game apparatus having game software operating thereon and including means for data input and data output;

a first personal computer, PC, apparatus having game software operating thereon and including means for data input and data output, said first PC apparatus including means for connecting said first PC apparatus to the Internet and means for data communications with a plurality of handheld game apparatus;

a game server including means for connecting to the Internet, said game server having a game database and game software operating thereon; and means for transmitting data from each of said handheld devices to said first PC apparatus and then to said game server.

22. The system in accordance with claim 21 including a plurality of additional PC apparatus each including means for connecting each of said PC apparatus to the internet and each including means for transmitting data.

23. The system in accordance with claim 22 further including a plurality of sets of handheld game playing apparatus wherein said handheld game playing apparatus communicates with one of said PC apparatus.

24. The system in accordance with claim 23, wherein said means for transmitting data from each of said handheld devices to said PC apparatus is a cable.

* * * * *

UNITED STATES PATENT AND TRADEMARK OFFICE
CERTIFICATE OF CORRECTION

PATENT NO. : 6,761,636 B2  Page 1 of 1
DATED : July 13, 2004
INVENTOR(S) : Chung et al.

It is certified that error appears in the above-identified patent and that said Letters Patent is hereby corrected as shown below:

Column 14,
Line 66, after "downlink" delete "of game processes, each capable of executing a second component of a specific game process and each logically connected to the second and third process threads for transmitting and receiving uplink and downlink".

Column 16,
Line 50, before "including" insert -- further --.

Signed and Sealed this

Seventh Day of February, 2006

JON W. DUDAS
*Director of the United States Patent and Trademark Office*